United States Patent
Ishikawa et al.

(10) Patent No.: US 9,555,815 B2
(45) Date of Patent: Jan. 31, 2017

(54) ELECTRIC POWER CONVERSION DEVICE, EMERGENCY TRAVELING SYSTEM AND RAILWAY VEHICLE

(71) Applicant: KABUSHIKI KAISHA TOSHIBA, Tokyo (JP)

(72) Inventors: Michiaki Ishikawa, Saitama (JP); Hiroaki Otani, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 375 days.

(21) Appl. No.: 14/181,453

(22) Filed: Feb. 14, 2014

(65) Prior Publication Data

US 2015/0061377 A1    Mar. 5, 2015

(30) Foreign Application Priority Data

Aug. 29, 2013    (JP) .................................. 2013-178107

(51) Int. Cl.
| | |
|---|---|
| *B61C 3/02* | (2006.01) |
| *B61C 17/00* | (2006.01) |
| *B61C 17/06* | (2006.01) |
| *B60L 9/22* | (2006.01) |
| *B60L 11/18* | (2006.01) |
| *B60L 1/00* | (2006.01) |
| *B60L 3/00* | (2006.01) |

(52) U.S. Cl.
CPC . *B61C 3/02* (2013.01); *B60L 1/00* (2013.01); *B60L 3/0092* (2013.01); *B60L 9/22* (2013.01); *B60L 11/1801* (2013.01); *B61C 17/00* (2013.01); *B61C 17/06* (2013.01); *B60L 2200/26* (2013.01); *Y02T 10/7005* (2013.01)

(58) Field of Classification Search
CPC ........................................................ H02J 3/005
USPC .......................................................... 307/64
See application file for complete search history.

(56) References Cited

U.S. PATENT DOCUMENTS

2014/0145678 A1*  5/2014  Hwang ................ H02J 7/0016
                                                                              320/118

FOREIGN PATENT DOCUMENTS

| JP | 2010-130772 A | 6/2010 |
|---|---|---|
| JP | 2011-004566 A | 1/2011 |
| JP | 2012-023903 A | 2/2012 |
| JP | 2012-222921 A | 11/2012 |

OTHER PUBLICATIONS

Chinese Office Action dated Oct. 26, 2016 in counterpart Chinese Patent Application 201480042818.8.

* cited by examiner

*Primary Examiner* — Robert Deberadinis
(74) *Attorney, Agent, or Firm* — Patterson & Sheridan, LLP

(57) ABSTRACT

According to one embodiment, an electric power conversion device includes an inverter which converts DC power into AC power and supplies the AC power to electric equipment of a railway vehicle, a battery capable of storing DC power, and a converter which converts the AC power into DC power and charges the battery. The battery supplies electric power to the inverter when the electric power is not supplied to the inverter from an external power source.

14 Claims, 4 Drawing Sheets

ELECTRIC POWER CONVERSION DEVICE, EMERGENCY TRAVELING SYSTEM AND RAILWAY VEHICLE

CROSS-REFERENCE TO RELATED APPLICATION

This application is based upon and claims the benefit of priority from Japanese Patent Application No. 2013-178107, filed Aug. 29, 2013, the entire contents of which are incorporated herein by reference.

FIELD

Embodiments described herein relate to electric power conversion device, an emergency traveling system, and a railway vehicle.

BACKGROUND

A railway vehicle is equipped with an electric motor which drives (enables movement of) the railway vehicle, and a vehicle control device which receives electric power from an overhead line, converts the electric power into power with the required voltage and current for operation of the electric motor, and supplies the electric power of the required voltage and current to the electric motor. When electric power is not supplied from the overhead line due to a power failure or the like, the operation of the electric motor stops so that the railway vehicle stops. Further, when electric power is momentarily not supplied from an overhead line due to a pantograph bounce or the like, electric equipment such as an air conditioner system or an illumination system in a train cabin stops, leading to reduction of services offered to customers on the train. In view of such circumstances, there has been a demand for the continuous supply of electric power to railway equipment such as an electric motor or electric equipment in a cabin even when electric power is not supplied from the outside such as from an overhead line.

In a rail yard where the maintenance of vehicles or the like is performed, overhead lines and third rails are installed. There has been a demand for the elimination of overhead lines in rail yards, from a viewpoint of the cost of construction and installation of the overhead lines, as well as safety. There has been also a demand for the elimination of third rails installed on the ground or at track level in the rail yard from a viewpoint of safety of field personnel to perform the maintenance of the third rails or the like.

DETAILED DESCRIPTION

According to an embodiment, there are provided an electric power conversion device, an emergency traveling system, and a railway vehicle for which the emergency traveling system may continue the supply of electric power to railway equipment even when electric power is not supplied to the railway equipment from the outside, such as from an overhead line.

In general, according to one embodiment, there is provided an electric power conversion device which includes: an inverter which converts DC power into AC power and supplies the AC power to electric equipment of a railway vehicle, a battery capable of storing DC power, and a converter which converts the AC power into DC power and charges the battery. The battery supplies electric power to the inverter when the electric power is not supplied to the inverter from an external power source.

Hereinafter, embodiments are explained in conjunction with drawings.

First Embodiment

Figure 1:
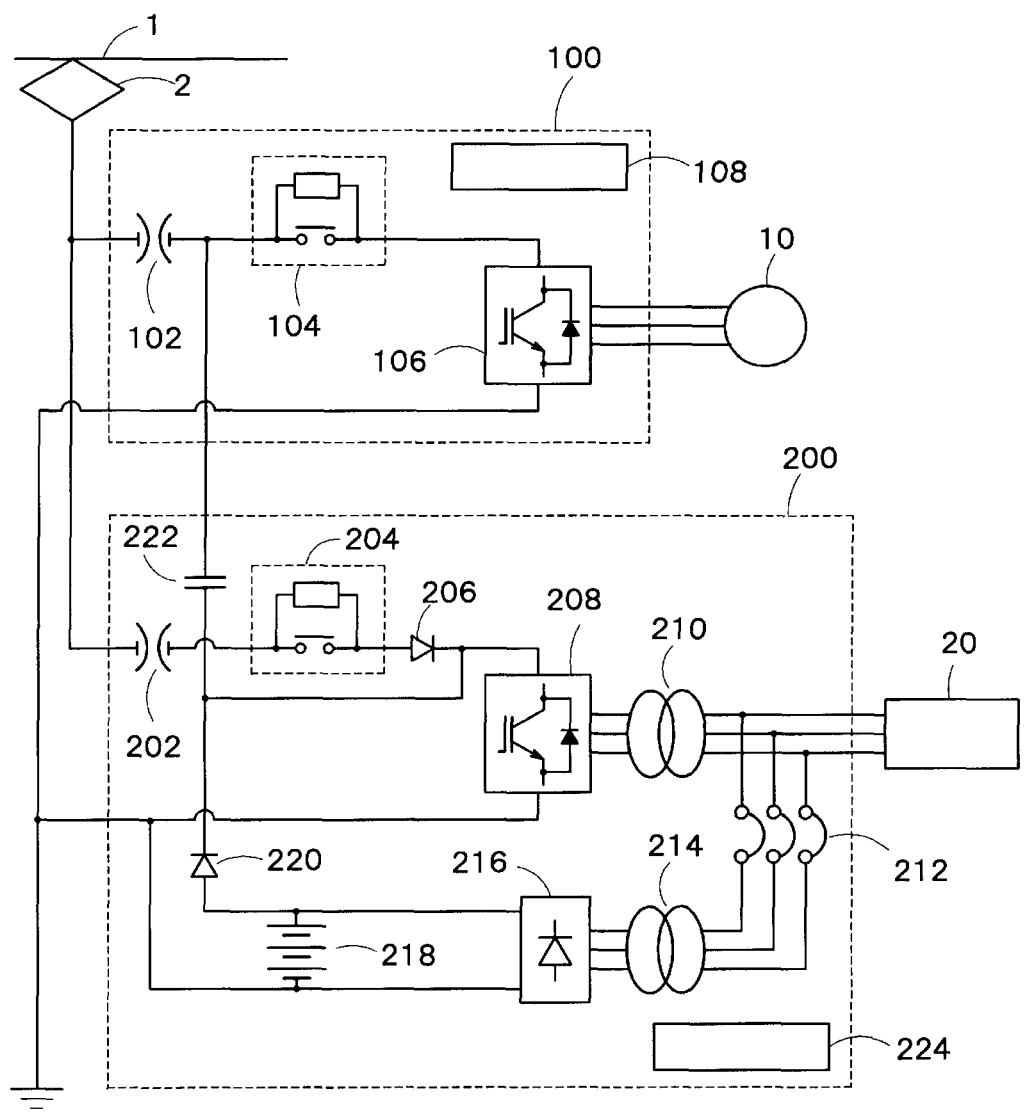
FIG. 1 is a schematic constitutional view of an emergency traveling system according to a first embodiment.

FIG. 1 shows a schematic constitution of an emergency traveling system according to the first embodiment. The emergency traveling system includes: a vehicle control device 100 which supplies electric power to an electric motor 10 which drives a railway vehicle; and an electric power conversion device 200 which supplies electric power to electric equipment 20 of the railway vehicle such as an air conditioning system or an illumination system. The emergency traveling system is provided for continuously supplying electric power to the electric motor 10 and the electric equipment 20 even when a state where the supply of electric power from an overhead line 1 becomes impossible due to a power failure or a pantograph bounce which occurs when a contact state between an overhead line 1 and a pantograph 2 may not be maintained due to jolting of the vehicle or the like.

The vehicle control device 100 includes a high-speed breaker 102, a charge circuit 104, an inverter 106 and a controller (control part) 108. The controller 108 may be provided outside of the vehicle control device 100. DC power collected from the overhead line 1 via the pantograph 2 is supplied to the inverter 106 through the high-speed breaker 102 and the charge circuit 104.

The inverter 106 converts the supplied DC power into AC power, and outputs the AC power to the electric motor 10. The inverter 106 includes a plurality of semiconductor switching elements, for example, each composed of an Insulated Gate Bipolar Transistor (IGBT), and a diode, clamp diodes or the like connected to the semiconductor switching elements in parallel. Turning on and off of semiconductor switching elements is controlled by the controller 108. The inverter 106 converts DC power into three phase AC power having a frequency and a voltage corresponding to a speed of the vehicle by a Variable Voltage Variable Frequency (VVVF) control.

As shown in FIG. 1, DC power is supplied to the inverter 106 from a battery 218 through a diode 220 and an emergency contactor (switch) 222 described later. For example, when a power failure occurs so that electric power is not supplied from the overhead line 1, the emergency contactor 222 is brought into a conductive state so that electric power is supplied to the inverter 106 from the battery 218. A control of the emergency contactor 222 is performed by a controller 224 described later.

The electric motor 10 drives the railway vehicle in a state where a rotor (not shown in the drawing) of the electric motor is connected to an axle of a drive wheel of the vehicle byway of a gear or the like or the rotor is directly connected to the axle of the drive wheel. The controller 108 performs an ON and OFF operation of switching elements of the inverter 106 based on an angle (position) of the rotor, an output current value of the inverter 106, a speed command or the like.

As shown in FIG. 1, the electric power conversion device 200 includes a high-speed breaker 202, a charge circuit 204, a diode 206, an inverter 208, an insulation transformer 210, a breaker 212, a battery charge transformer 214, a converter 216, a battery 218, a diode 220, the emergency contactor 222, and the controller (control part) 224. The controller 224 may be provided outside the electric power conversion device 200.

DC power collected from the overhead line 1 via the pantograph 2 is supplied to the inverter 208 through the high-speed breaker 202, the charge circuit 204 and the diode 206. The inverter 208 converts the supplied DC power into AC power, and outputs the AC power to the electric equipment 20 via the insulation transformer 210.

The inverter 208 incorporates therein a plurality of semiconductor switching elements, for example, each comprising an IGBT, a diode or a clamp diode connected to the semiconductor switching element in parallel and the like, and turning on and off of the semiconductor switching elements is controlled by the controller 224. The inverter 208 is a Constant Voltage Constant Frequency (CVCF) inverter which outputs electric power of a fixed voltage and a fixed frequency to the electric equipment 20.

As shown in FIG. 1, an output of the inverter 208 is supplied to the converter 216 through the insulation transformer 210, the breaker 212 in a conductive state, and the battery charge transformer 214. The converter 216 converts AC power output from the inverter 208 into DC power, and charges the battery 218 with the DC power. The battery 218 in which the DC power is stored may supply electric power to the inverter 208 through the diode 220. For example, when a power failure or a pantograph bounce occurs so that electric power is not supplied from the overhead line 1, electric power is supplied to the inverter 208 from the battery 218.

It is preferable that the controller 224 controls the converter 216 such that a voltage of the battery 218 is equal to or lower that the normal operating voltage of the overhead line. By such control, the overhead voltage is usually higher than the battery voltage and hence, electric power may be supplied to the electric equipment 20 without using electric power stored in the battery 218. On the other hand, when a power failure or a pantograph bounce occurs so that an overhead line voltage becomes lower than a battery voltage, electric power stored in the battery 218 is supplied to the inverter 208 so that electric power may be continuously supplied to the electric equipment 20. The controller 224 brings the breaker 212 into a breaking (opened) state when electric power is supplied to the inverter 208 from the battery 218.

For example, the controller 224 performs a control where a voltage of the battery 218 becomes lower than a rated overhead line voltage by 100V (volts). For example, when the rated overhead line voltage is 1,500V, the battery 218 is charged to maintain a voltage thereof at 1,400V or below.

A minimum voltage maintained in the battery 218 during normal, non-battery, operation of the vehicle may be the minimum value of a performance assurance voltage of the electric power conversion device 200. For example, when the performance assurance voltage of the electric power conversion device 200 is 1,300V to 1,800V, the voltage of the battery 218 may be maintained at 1,300V during normal, non-battery, operation of the train vehicle.

Alternatively, a voltage of the battery 218 may be maintained at a minimum value of the variable range of the voltage of an overhead line. For example, when the variable range of the overhead line voltage is 1,000V to 2,000V, the voltage of the battery 218 is maintained at 1,000V.

When electric power is not supplied from the overhead line 1 due to a power failure or the like, the controller 224 brings the emergency contactor 222, which is a switch, into a state so that electric power is supplied therethrough from the battery 218 to the inverter 106 of the vehicle control device 10.

For example, the controller 224 brings the emergency contactor 222 into a conductive state based on an instruction from a driver's cabin. Further, when a voltage of a filter capacitor (not shown in the drawing) which is provided in the inside of the electric power conversion device 200 becomes below a predetermined value, the controller 224 determines that the supply of electric power from the overhead line 1 is stopped or interrupted, and it may bring the emergency contactor 222 into a conductive state.

When a state where the disruption of the supply of an overhead line voltage continues for a predetermined time, the controller 224 may bring the emergency contactor 222 into a conductive state, and thus supply electric power to the inverter 106 from the battery 218. That is, when a state where the supply of an overhead line voltage is momentarily interrupted, as in the case of a pantograph bounce, the switching of the supply of electric power to the inverter 106 from the battery 218 is not performed. This is because that when the time during which electric power is not supplied from the overhead line 1 is short, the vehicle may travel without stopping (by inertia or coasting).

In this manner, according to this embodiment, usually, electric power is supplied to the inverters 106, 208 from the overhead line 1 and the battery 218 is also charged or being charged. On the other hand, when electric power is not supplied from the overhead line 1 due to a power failure or the like, electric power is supplied to the inverters 106, 208 from the battery 218. Accordingly, even in a state where the supply of an overhead voltage is interrupted, the electric motor 10 may continue to operate so that the vehicle may continuously travel without stopping. Further, the supply of electric power to electric equipment 20 such as an air conditioning system or an illumination system may be continued and hence, services offered to clients may be maintained at an expected level. It is possible, using the battery of the emergency backup system to operate the vehicle even in a rail yard having neither overhead lines nor third rails.

In introducing the emergency traveling system according to this embodiment in a railway vehicle, it is sufficient to replace an electric power conversion device which supplies electric power to electric equipment such as an air conditioning system or an illumination system with the electric power conversion device 200 according to this embodiment and, at the same time, to additionally arrange an electrical line which connects the emergency contactor 222 and the charge circuit 104 to each other. Accordingly, the emergency traveling system according to this embodiment may be easily introduced or retrofitted into a railway vehicle.

In the above-mentioned embodiment, a charge characteristic of the battery 218 may be set to match a voltage drop characteristic of the battery charge transformer 214. Due to such matching, a charge control of a battery voltage may be performed without performing a control of a battery voltage based on an output voltage of the inverter 208.

Figure 2:
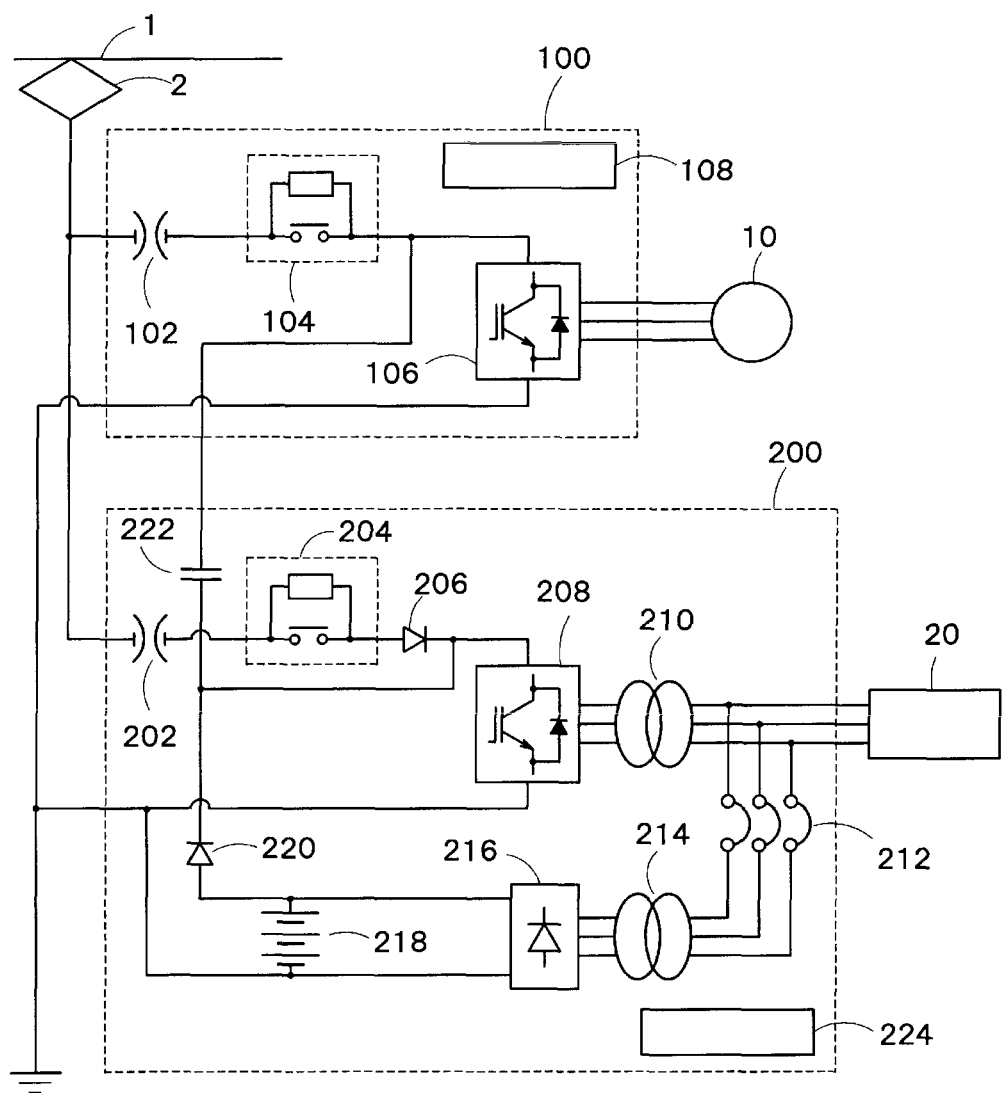
FIG. 2 is a schematic constitutional view of an emergency traveling system according to a modification.

In the above-mentioned embodiment, electric power of the battery 218 is supplied to the inverter 106 via the charge circuit 104. However, as shown in FIG. 2, electric power of the battery 218 may be directly supplied to the inverter 106 without via the charge circuit 104.

In the above-mentioned embodiment, the explanation has been made with respect to the case where the controller 224 performs a control of the emergency contactor 222. However, the controller 108 may perform the control of the emergency contactor 222. Further, the emergency contactor 222 may be arranged in the inside of the vehicle control device 100, and the emergency contactor 222 may be controlled by the controller 108.

Second Embodiment

Figure 3:
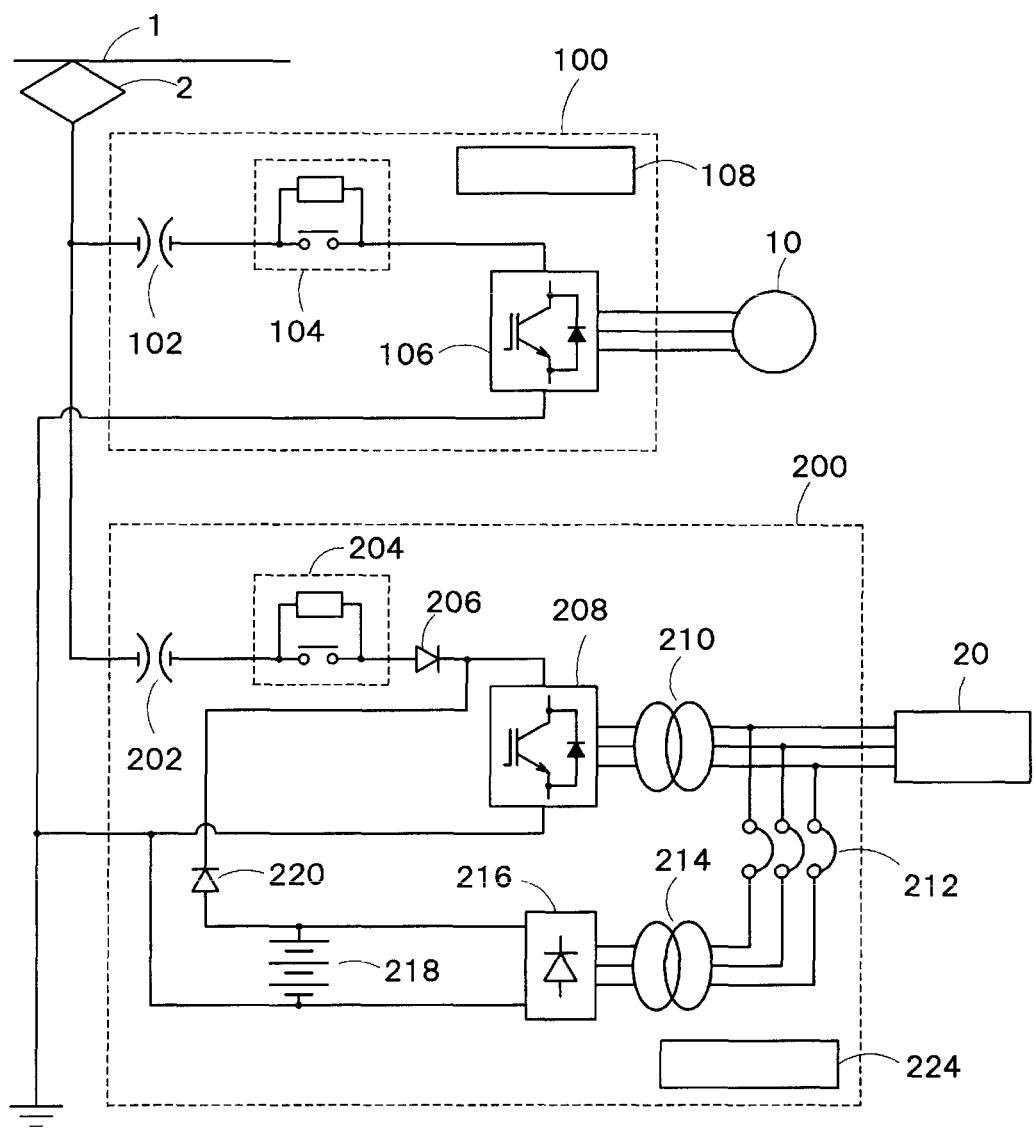
FIG. 3 is a schematic constitutional view of an emergency traveling system according to a second embodiment.

FIG. 3 shows the schematic constitution of an emergency traveling system according to the second embodiment. The emergency traveling system according to this embodiment differs from the emergency traveling system according to the first embodiment shown in FIG. 1 with respect to points where an emergency contactor 222 is omitted and the supply of electric power to a vehicle control device 100 from a battery 218 is not performed. Other constitutions and the manner of operation of the second embodiment are substantially equal to the corresponding constitutions and manner of operation of the above-mentioned first embodiment and hence, the explanation of the constitutions and the manner of operation of the second embodiment is omitted.

According to this embodiment, in a state where the supply of an overhead line voltage is interrupted, electric power is supplied to the inverter 208 from the battery 218 so that an operation of electric equipment 20 such as an air conditioning system or an illumination system may be continued thus maintaining services offered to clients.

Third Embodiment

Figure 4:
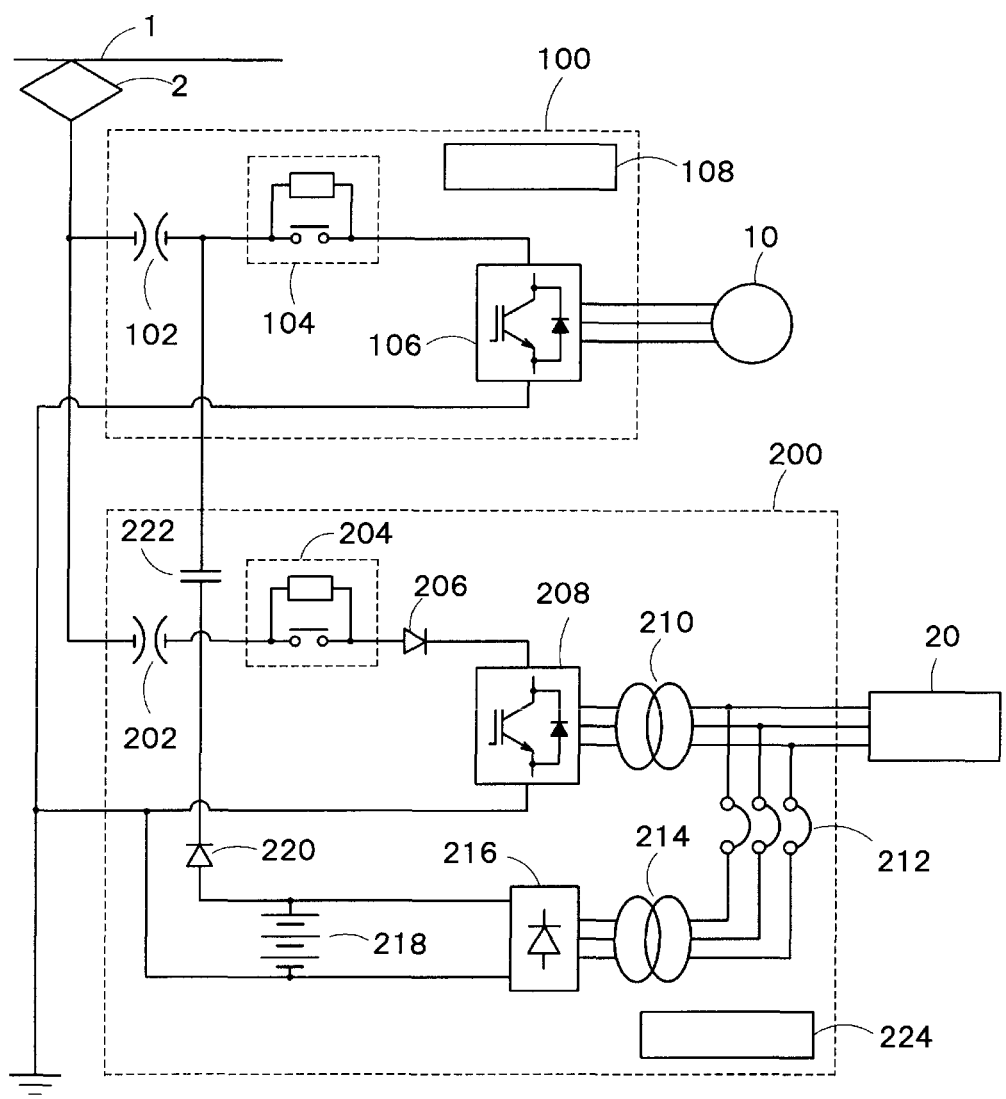
FIG. 4 is a schematic constitutional view of an emergency traveling system according to a third embodiment.

FIG. 4 shows the schematic constitution of an emergency traveling system according to the third embodiment. The emergency traveling system according to this embodiment differs from the emergency traveling system according to the first embodiment shown in FIG. 1 with respect to points where a return line from a diode 220 to an inverter 208 is omitted, and the electric power is not supplied to the inverter 208 from the battery 218. Other constitutions and the manner of operation of the third embodiment are substantially equal to the corresponding constitutions and manner of operation of the above-mentioned first embodiment and hence, the explanation of the constitutions and the manner of operation of the third embodiment is omitted.

According to this embodiment, in a state where the supply of an overhead line voltage is interrupted, the supply of electric power to the inverter 106 from the battery 218 is performed so that an electric motor 10 may be driven, and the vehicle may continuously travel without stopping.

In the above-mentioned first to third embodiments, the explanation has been made with respect to the example where the emergency traveling system is applied to a DC electric train. However, the emergency traveling system may be applicable to an AC electric train. In this case, the charge circuits 104, 204 are omitted, and a main transformer, and a converter which converts AC power into DC power and supplies the DC power to the inverter 106, 208 may be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electric power conversion device comprising:
   a first inverter which converts DC power into AC power and supplies the AC power to electric equipment of a railway vehicle;
   a battery which stores DC power;
   a converter which converts the AC power into DC power and charges the battery, wherein the battery supplies electric power to the first inverter when the electric power is not supplied to the first inverter from an external power source; and
   a second inverter, wherein, upon interruption of the power supply from the external power source, the battery is electrically connected to the first inverter and the second inverter.

2. The electric power conversion device according to claim 1, wherein
   the battery is charged to a voltage equal to or less than the lower limit value of the voltage range of the external power source.

3. The electrical power conversion device according to claim 1, wherein during a period where power is supplied by the external power source, the external power source is connected to the first inverter and second inverter, and the battery is disconnected from the first inverter and second inverter.

4. The electrical power conversion device according to claim 3, wherein the first inverter is connected to an electric motor, and the second inverter is connected to a load other than the motor.

5. An emergency traveling system for a railway vehicle supplied with DC power from an external power source comprising:
   a first inverter which converts DC power from an external power source into AC power and supplies the AC power to an electric motor which drives a railway vehicle;
   a second inverter which converts DC power from an external power source into AC power and supplies the AC power to electric equipment of the railway vehicle;
   a battery which stores DC power; and
   a converter which converts the AC power outputted from the second inverter into DC power to charge the battery, wherein
   the battery supplies electric power to at least one of the first inverter and the second inverter when the electric power is supplied to neither the first inverter nor the second inverter from the external power source.

6. The emergency traveling system according to claim 5, wherein the railway vehicle includes an additional electrical load, and the second inverter supplies power to the additional electrical load.

7. The emergency traveling system according to claim 5, further including a breaker interposed between the second inverter and the battery, the breaker configured to open and isolate the battery from the second inverter when electric power is supplied to neither the first inverter nor the second inverter from the external power source.

8. The emergency traveling system according to claim 5, wherein the first inverter is capable of converting DC power supplied by the battery into AC power for supply to the motor.

9. The emergency traveling system according to claim 5, wherein the second inverter is capable of converting DC power supplied by the battery into AC power for supply to the electric equipment of the railway vehicle.

10. The emergency traveling system according to claim 5, wherein
the battery is charged at a voltage equal to or below a lower limit value within a supply voltage range of the external power source.

11. The emergency traveling system according to claim 5, further including a switch interposed between the battery and the first inverter.

12. A railway vehicle comprising:
an emergency traveling system that includes:
a vehicle control device having a first inverter which converts DC power from an external power source into AC power and supplies the AC power to an electric motor which drives a railway vehicle; and
an electric power conversion device having a second inverter which converts DC power from the external power source into AC power and supplies the AC power to electric equipment of the railway vehicle, a battery capable of storing DC power, and a converter which converts the AC power output from the second inverter into DC power to charge the battery,
wherein the battery supplies electric power to at least one of the first inverter and the second inverter when the electric power is supplied to neither the first inverter nor the second inverter from the external power source.

13. The railway vehicle according to claim 12, wherein the battery is charged at a voltage equal to or below a lower limit value within a supply voltage range of the external power source.

14. The railway vehicle according to claim 12, wherein the battery is disconnected from the second inverter when the battery is used to power the electric motor of the railway vehicle.

* * * * *